United States Patent
Arnabat Benedicto et al.

(10) Patent No.: US 9,290,030 B2
(45) Date of Patent: Mar. 22, 2016

(54) DETERMINING A COLOR OF A COLOR PATCH

(71) Applicant: HEWLETT-PACKARD DEVELOPMENT COMPANY, L.P., Houston, TX (US)

(72) Inventors: Jordi Arnabat Benedicto, Tarragona (ES); Francisco Javier Pérez Gellida, Barcelona (ES); Juan Uroz Soria, Terrassa (ES); Oriol Borrell Avila, Sabadell (ES); Emilio Angulo Navarro, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/853,000

(22) Filed: Sep. 14, 2015

(65) Prior Publication Data

US 2016/0001582 A1    Jan. 7, 2016

Related U.S. Application Data

(63) Continuation of application No. 14/375,554, filed as application No. PCT/US2012/024090 on Feb. 7, 2012, now Pat. No. 9,132,681.

(51) Int. Cl.
*B41J 29/393* (2006.01)
*G01J 3/02* (2006.01)
*G01J 3/46* (2006.01)

(52) U.S. Cl.
CPC ............... *B41J 29/393* (2013.01); *G01J 3/027* (2013.01); *G01J 3/0289* (2013.01); *G01J 3/46* (2013.01); *B41J 2029/3935* (2013.01)

(58) Field of Classification Search
CPC .. B41J 29/393; B41J 2029/3935; G01J 3/027; G01J 3/0289; G01J 3/46
USPC ............................................................ 347/19
See application file for complete search history.

(56) References Cited

U.S. PATENT DOCUMENTS

| | | | |
|---|---|---|---|
| 6,454,478 B2 | 9/2002 | Wotton | |
| 6,755,499 B2 | 6/2004 | Castano et al. | |
| 7,036,737 B2 * | 5/2006 | Nakayama | H04N 1/00002 235/454 |
| 7,271,935 B2 | 9/2007 | Coons et al. | |

(Continued)

FOREIGN PATENT DOCUMENTS

| | | |
|---|---|---|
| EP | 1262749 | 12/2002 |
| EP | 1298918 | 4/2003 |

OTHER PUBLICATIONS

European Patent Office, Supplementary European Search Report, May 28, 2015, EP Patent Application No. 12868127.7 (2 pages).

(Continued)

*Primary Examiner* — Stephen Meier
*Assistant Examiner* — Alexander D Shenderov
(74) *Attorney, Agent, or Firm* — Trop, Pruner & Hu, P.C.

(57) ABSTRACT

A measured distance is received from a distance sensor, where the measured distance is indicative of a distance between a color sensor and a substrate. Using the measured distance, a location of a given projection of projections of a substrate support is determined. A color of a color patch on the substrate at the determined location of the given projection is determined.

20 Claims, 7 Drawing Sheets

(56) References Cited

U.S. PATENT DOCUMENTS

| | | |
|---|---|---|
| 7,946,700 B2 | 5/2011 | Rufes et al. |
| 7,963,624 B2 | 6/2011 | Yasutani et al. |
| 2001/0028380 A1 | 10/2001 | Wotton et al. |
| 2002/0126301 A1 | 9/2002 | Bowers |
| 2003/0063338 A1 | 4/2003 | Gudaitis et al. |
| 2006/0126137 A1* | 6/2006 | Coons ............... G03G 15/5062 358/504 |
| 2006/0132787 A1 | 6/2006 | Mestha et al. |
| 2007/0046941 A1 | 3/2007 | Mestha et al. |
| 2009/0109269 A1* | 4/2009 | Rufes ..................... B41J 11/002 347/102 |
| 2009/0214241 A1 | 8/2009 | Kawaguchi et al. |
| 2010/0213666 A1 | 8/2010 | Harney et al. |
| 2010/0284009 A1 | 11/2010 | DiCarlo |
| 2011/0103815 A1 | 5/2011 | Hanashi |
| 2013/0107326 A1 | 5/2013 | Kowal |

OTHER PUBLICATIONS

Korean Intellectual Property Office, The International Search Report and the Written Opinion of the International Searching Authority for International Appl. No. PCT/US2012/024090 dated Oct. 16, 2012 (8 pages).

European Patent Office, Communication pursuant to Article 94(3) EPC for EP Appl. No. 12868127.7 dated Jul. 6, 2015 (7 pages).

The International Bureau of WIPO, International Preliminary Report on Patentability for PCT/US2012/024090 dated Aug. 21, 2014 (5 pages).

* cited by examiner

DETERMINING A COLOR OF A COLOR PATCH

CROSS REFERENCE TO RELATED APPLICATIONS

This is a continuation of U.S. application Ser. No. 14/375,554, filed Jul. 30, 2014, which is a national stage application under 35 U.S.C. §371 of PCT/US2012/024090, filed Feb. 7, 2012, both are hereby incorporated by reference in their entirety.

BACKGROUND

The colors produced by color printers can vary as a function of media type, ink, print heads, temperature, humidity, etc. To address color variation, color characterization instruments (e.g., spectrophotometers) and device characterization profiling tools (e.g. International Color Consortium (ICC) profiles) for devices such as printers may be created. Device characterization profiling facilitates proper color handling.

In order to create a printer color profile, a printing system may print a test color pattern. For example, a test color pattern may be printed including a plurality of color patches arranged in a predetermined pattern. A color measurement device (e.g., a spectrophotometer or a colorimeter) may scan the test color pattern, and the color measurements may be used to create a profile for the printer that can be used to insure printing colors in a consistent manner.

There are a variety of methods for analyzing colors printed on a substrate. Such methods include, for example, using a hand-held spectrophotometer including a wheel that contacts the color patches on the paper. The wheel is for maintaining a desired spatial relationship between the spectrophotometer and the paper. As the spectrophotometer is moved, the wheel measures the speed and direction of the movement while the spectrophotometer determines color on locations across the substrate.

In some other methods, a color sensor (e.g., a spectrophotometer or a colorimeter) is mounted in the paper path of the moving sheets in a printer to provide color measurements of the test color patches printed on the sheets as they pass the color measurement device. In such color analysis methods, the color sensor does not contact the paper. However, color sensors may be sensitive to sensor-to-substrate distance. Hence, factors such as variations in a paper's position or differences in media thickness may reduce color analysis accuracy.

BRIEF DESCRIPTION OF THE DRAWINGS

In order that the present disclosure may be well understood, various examples will now be described with reference to the following drawings.

DETAILED DESCRIPTION

In the following, numerous details are set forth to provide an understanding of the examples disclosed herein. However, it will be understood that the examples may be practiced without these details. Further, in the following detailed description, reference is made to the accompanying figures, in which various examples are shown by way of illustration. In this regard, directional terminology, such as "top," "bottom," "front," "back," "left," "right," "vertical," etc., is used with reference to the orientation of the figures being described. Because disclosed components can be positioned in a number of different orientations, the directional terminology is used for purposes of illustration and is in no way limiting. Like numerals are used for like and corresponding parts of the various figures. While a limited number of examples are illustrated, it will be understood that there are numerous modifications and variations therefrom.

As set forth above, there are a variety of methods for analyzing colors printed on a substrate. However, color analysis may still be insufficiently accurate for some specific applications. For example, in methods in which hand-held spectrophotometers are used, since the spectrophotometer device contacts the paper, it can distort a color test pattern thereby making a color measurement inaccurate. Further, in a method using a color sensor such as a spectrophotometer or colorimeter, since the color sensor does not contact the paper and color sensors may be sensitive to sensor-to-substrate distance, variations in a substrate vertical position may reduce accuracy of the color analysis. Such differences in the vertical position between locations of a substrate are referred herein as substrate-height variability.

Further, as the present inventors have understood, some specific printing systems may be particularly prone to substrate-height variability. More specifically, some printing systems may include a substrate support for supporting the substrate, at least, in a color measurement zone during operation of a color sensor for color analysis. The substrate support may include projections extending from a base of the support and arranged to support the substrate. A projection of a substrate support as referred herein refers to a portion raised with respect to a support base and providing the contact surface for supporting the substrate portion during, at least, color analysis.

The substrate support further may further include spacings to allow deformation of the substrate towards the support base. Deformation of the substrate towards the support base may be desirable in order to avoid upward buckling of the substrate (upward buckling may damage the substrate and/or printer elements, such as a printhead, disposed above it). However, as can also be appreciated from FIGS. 3 and 8, substrate deformation may promote substrate-height variability. As set forth above, substrate-height variability may render color measurements performed across a substrate for color analysis inconsistent.

Techniques are described herein that facilitate compensating substrate-height variability influence on color analysis. In some examples herein, substrate-height variability may be compensated by conveniently selecting how a color patch is to be printed on the substrate. More specifically, dimension and location in the substrate of the color patches may be selected such that, for each color patch, at least a portion of the color patch can be positioned on a support projection in the color measurement zone when the substrate is positioned on the substrate support for operation of a color sensor. By way of example, the selection may be performed based on dimension and location of support elements such as the support projections or openings. Thereby, dimension and location of color patches may be conveniently selected.

Further, the substrate may be positioned on the substrate support such that at least a portion of a color patch printed on the substrate is on a support projection. Then, color of the color patch may be determined by operating a color sensor to acquire color of the color patch at a sample portion of the color patch, the sample portion being on the support projection. Color calibration of the printing system may be then based on determined colors corresponding to sample portions being on support projections. Thereby, it is facilitated to reduce substrate-height variability in the color measurements so that color calibration can be performed using data with better consistency.

Figure 1A:
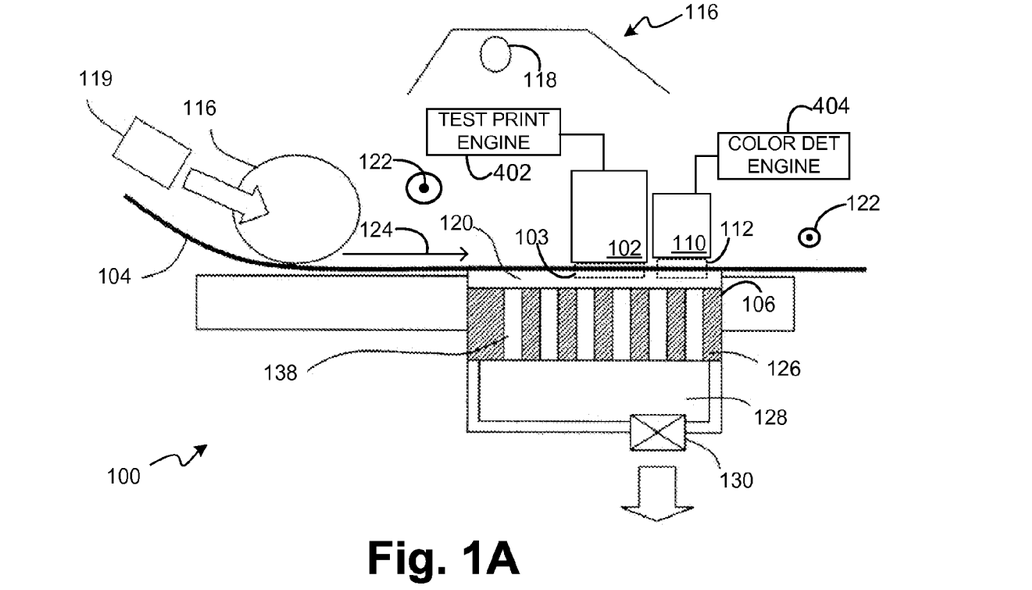
FIG. 1A schematically depicts a printing system according to examples.
Figure 6A:
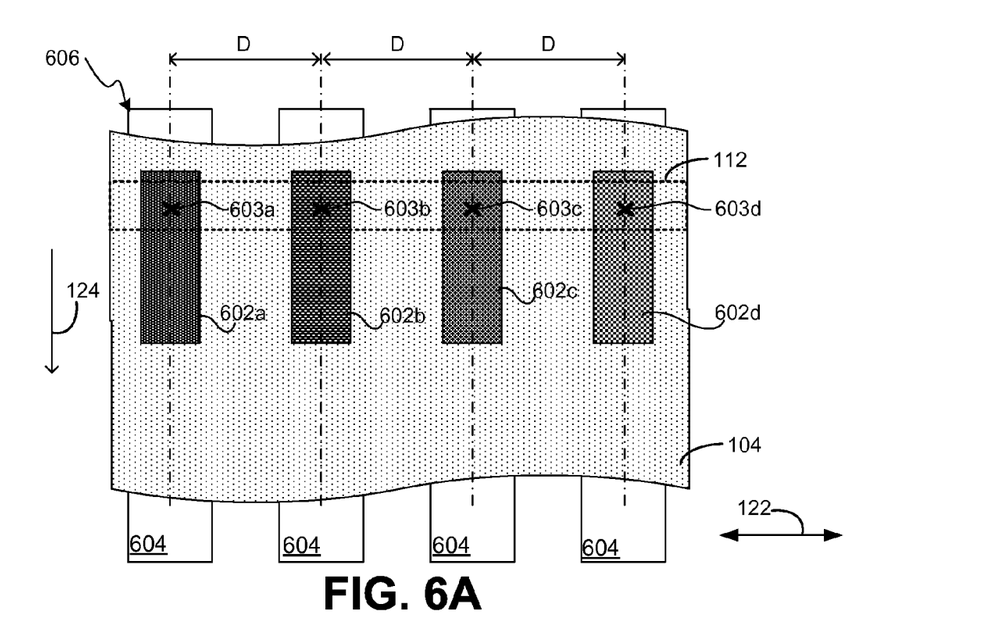
FIG. 6A schematically depicts a substrate printed with color patches according to examples, the substrate being supported by a substrate support.
Figure 6B:
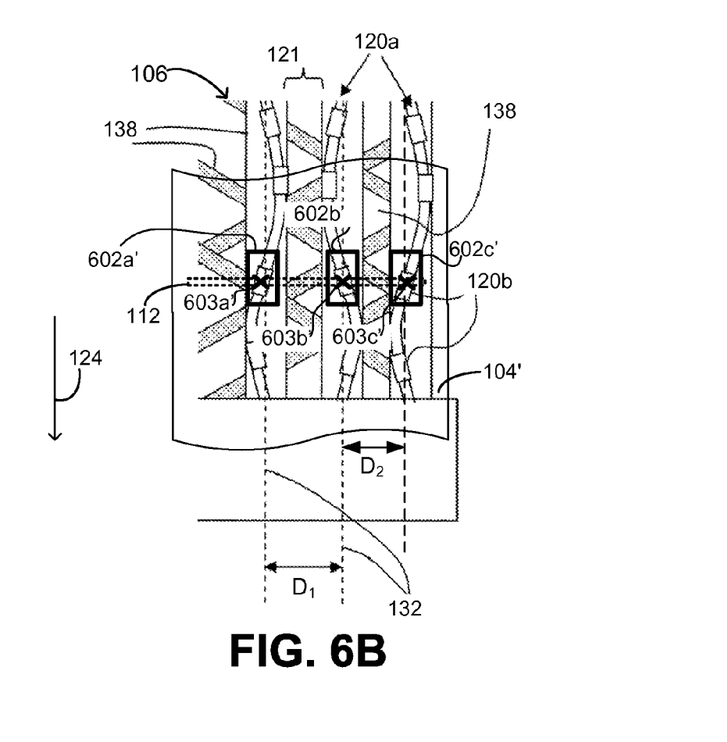
FIG. 6B schematically depicts a substrate printed with color patches according to examples, the substrate being supported by a substrate support.

In the following, non-limiting examples of printing systems that may be particularly prone to substrate-height variability are illustrated with respect to FIG. 1A-2. FIG. 1A schematically depicts a printing system 100 according to examples. Printing system 100 includes a printing arrangement 102 for printing in a printing zone 103 beneath printing arrangement 102, a substrate 104 while supported by a substrate support 106. A printing arrangement refers to any arrangement suitable to print a pattern (e.g., a pattern including one or more color patches) on a substrate. An example of a printing arrangement is illustrated with respect to FIG. 3. Examples of color patches are shown in FIGS. 6A, 6B.

A feeding mechanism 116 may be provided for advancing substrate 104 towards printing zone 103, i.e., along a media advance direction 124.

Figure 3:
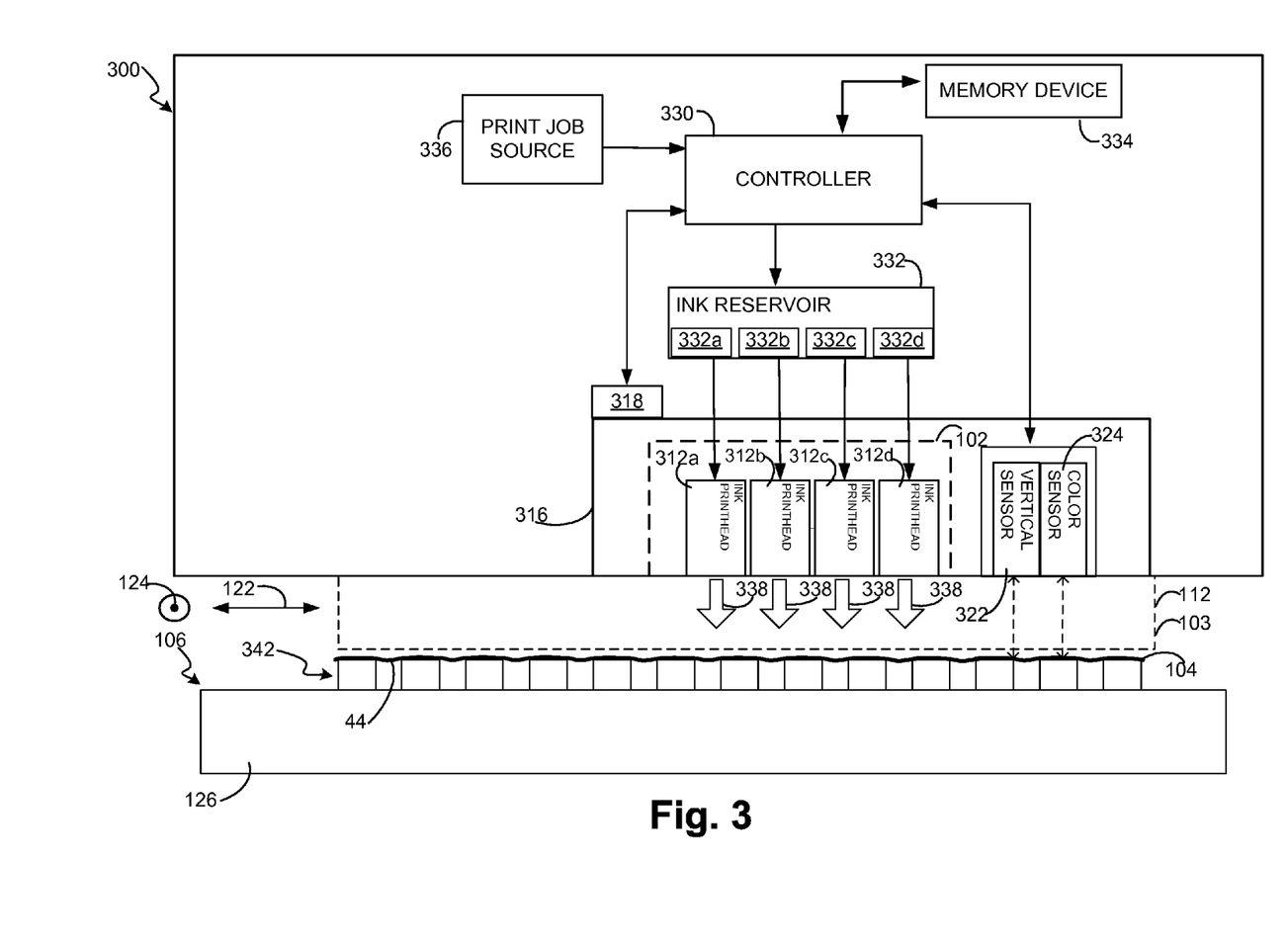
FIG. 3 is a block diagram of a printing system according to examples.
Figure 4:
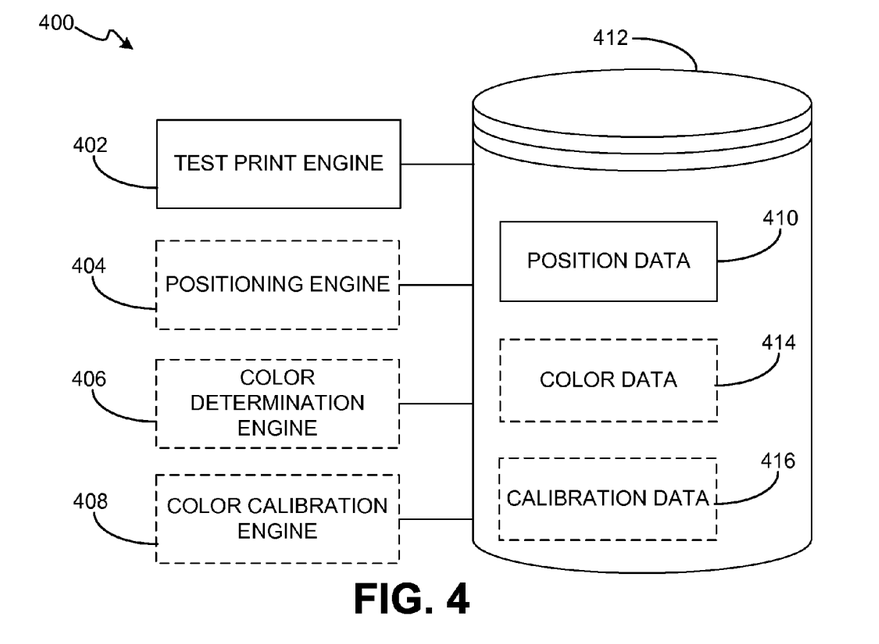
FIG. 4 schematically depicts a system according to examples.
Figure 5:
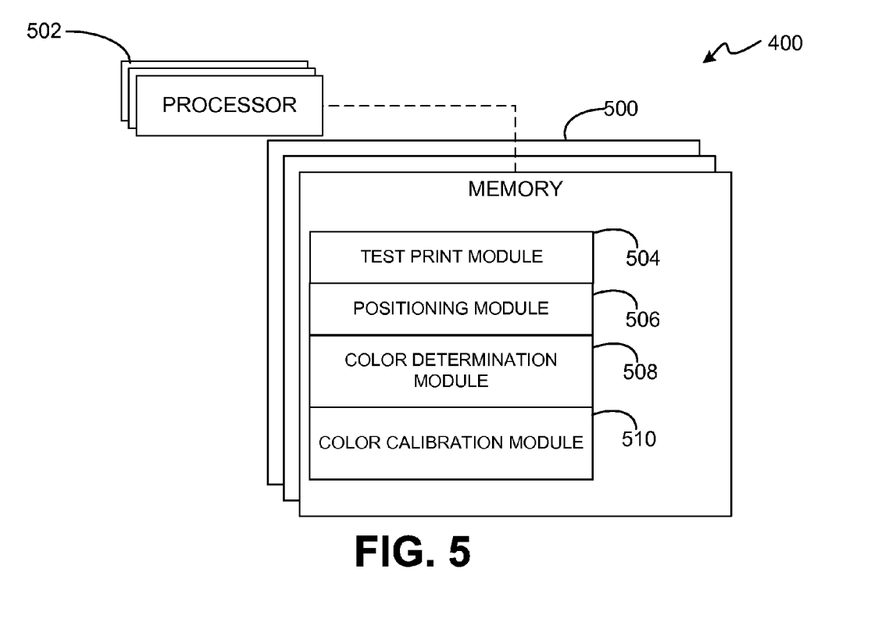
FIG. 5 is a block diagram depicting a computer readable medium according to examples.

A test print engine 402 may be communicatively coupled to printing arrangement 102 for causing printing of a color patch on substrate 104 as described with respect to FIGS. 4-5. For performing printing, a printhead of printing arrangement 102 may be scanned along a transition direction 122 (perpendicular to the plane of FIG. 1), i.e. across the width of substrate 104 as further illustrated with respect to FIG. 3.

In the illustrated example, printing system 100 further includes a color sensor arrangement 110 for measuring color on substrate 104 in a color measurement zone 112. For performing color acquisition, color sensor arrangement 110 may be scanned along transition direction 122. A color determination engine 404 may be communicatively coupled to color sensor arrangement 110 for color analysis as described with respect to FIGS. 4-5.

In some examples, a printing system may be configured such that sensor-to-substrate distance with respect to a color sensor corresponds to a nominal value of the color sensor when color is acquired at substrate locations positioned over a support projection. More specifically, height of support projections may be such that, when the color sensor determines color of a specific substrate portion on those support projections, sensor-to-substrate distance corresponds to a nominal value of the color sensor.

A nominal value of a color sensor is the value, or range of values, of sensor-to-substrate distance specified by the manufacturer to operate the color sensor. Vertical distance between the color sensor and top portions of the substrate support may be chosen for complying with such nominal values. (Other factors may be taken into account such as a typical substrate thicknesses or sensor angle.) A configuration of a printing system for complying with nominal specifications of the color sensor as described herein facilitates not only reducing measurement variability but also improving measurement reliability.

Herein, printing systems configured as a wet ink printer are also contemplated. A wet ink printer is configured to use ink including a relatively high amount of water (e.g. a latex ink). A wet ink printer may include components for facilitating wet ink printing and, in view of the relatively high content of water of a wet ink, for promoting drying of a printed substrate such as heating systems or pre-treatment arrangements for fixing the ink to the substrate. In the illustrated example, printing system 100 includes a heat source 116 for heating substrate 104. In the illustrated example, heat source 116 includes a radiant source 118 (e.g., an infrared lamp). A heat source as referred to herein is intended to encompass any structure suitable to heat a substrate in a printing zone. In examples, radiant source 118 may be constituted by a conductive source (e.g., substrate support 106 may integrate a heating system for conductively heating substrate 104 such as strip heater 207 shown in FIG. 2).

Cooling of print components of printing system 100 (e.g., a printhead in printing arrangement 102) may be provided by a fan/blower arrangement 119. For example, fan/blower arrangement 119 may generate a 2 m/s airflow over the surface of the print medium for cooling of elements in printing arrangement 102.

Heat source 116 may be configured to heat substrate 104 to a temperature above 50 degrees Celsius or, more specifically, to a temperature around 55 to 60 degrees Celsius. In some applications where it is desirable to cure ink ejected on substrate 104 (e.g., a latex ink), a further heat source (not shown) may be implemented for promoting ink curing in a curing zone provided downstream printing zone 103 by heating substrate 104 to a higher temperature (e.g., a temperature between 60 and 80 degrees Celsius).

As an ink contacts a print medium (e.g., substrate 104), water in the ink may saturate fibers of the used print medium thereby causing the fibers to expand, which in turn may cause the print medium to buckle. Buckling, also referred to as cockling, of a print medium tends to cause the print medium either to uncontrollably bend downwardly away from the printheads, or to uncontrollably bend upwardly toward the printheads. In either case, a constant printhead-to-print medium spacing is not achieved, which might lead to poor print quality. Additionally, an upwardly buckling print medium may contact a printhead, which may lead to ink smearing on the print medium and/or damages in the printhead or the print medium.

For addressing substrate buckling, a substrate support may include openings to allow deformation of the substrate towards a support base. In the illustrated example, substrate support 106 is constituted by a platen including (a) ribs 120 extending from a base 126 of support 106, and (b) openings 121 (show in FIGS. 1B-1C) formed as clear spacings between adjacent ribs. Ribs as referred to herein are intended to encompass any set of elongated structure suitable to support a substrate with spaces provided therebetween. Ribs may be characterized by any shape such as a non-straight shape or, more specifically, a zigzag shape. The platen can be flat or slightly curved, depending on which feed arrangement is used.

In the illustrated example, conduits 138 (which can also be appreciated in FIG. 1C) extend through base 126 to openings 121. A vacuum chamber 128 may be disposed beneath base 126 for maintaining a vacuum generated by a vacuum arrangement 130. Vacuum arrangement 130 may include a pump system and/or a fan system for vacuum generation. The vacuum may be further formed into conduits 138 and openings 121 for (a) holding substrate 104 against upper surfaces of ribs 120, and (b) further preventing buckling of substrate 104 towards printing arrangement 102.

Figure 1B:
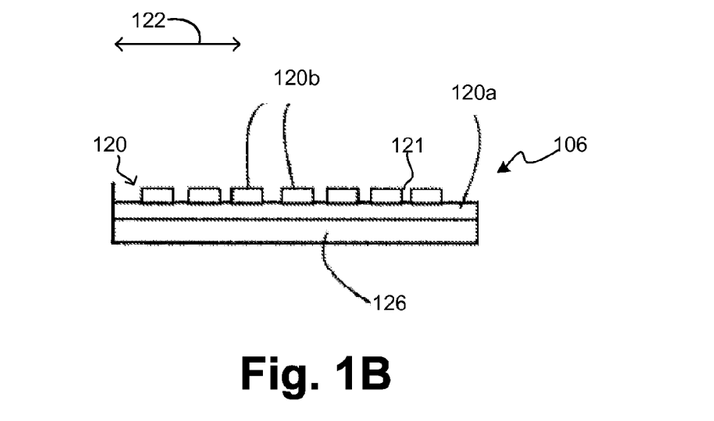
FIG. 1B schematically depicts a front-view of an example of substrate support for the printing system depicted in FIG. 1A.
Figure 1C:
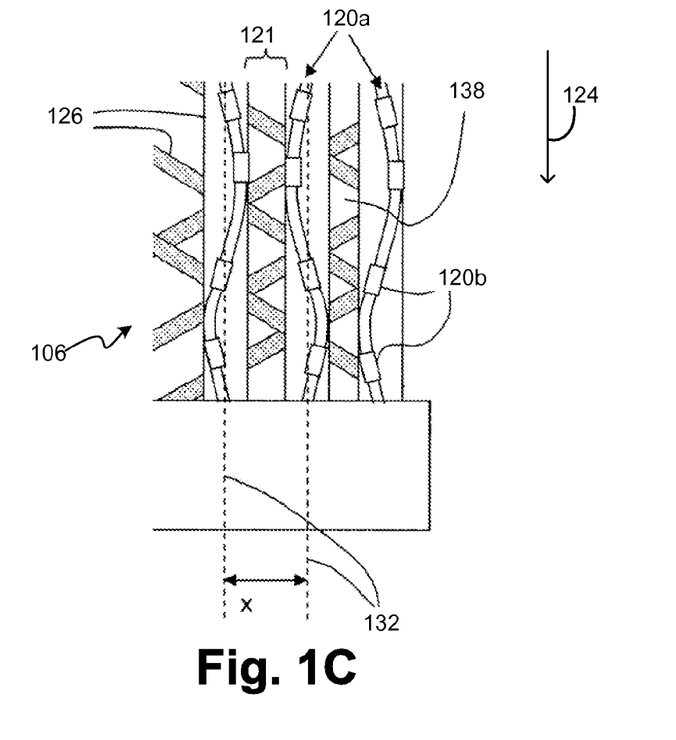
FIG. 1C schematically depicts a partial perspective view of an example of the substrate support depicted in FIG. 1A.

Further details on substrate support 106 can be appreciated from FIGS. 1B-1C. FIG. 1B schematically depicts a front-view of an example of substrate support 106 for a printing system according to examples. FIG. 1C schematically depicts a partial top view of substrate support 106.

Looking at FIG. 1C, ribs in substrate support 106 extend generally along straight paths 132 (which can be considered to be rib axes). Openings 121 in the form of spacings are between adjacent ribs. Straight paths 132 may be disposed along media advance direction 124 for facilitating advance of substrate 104 in that direction. Ribs may include a curved shape or, more specifically, follow a zigzag path. As shown, the zigzag path may be smooth rather than angular, e.g., following a waved profile. A zigzag path as shown in FIG. 1C reduces the length of a contact surface between the print media and the rib in the media advance direction, so that the contact across the substrate is distributed discontinuously in the media advance direction for addressing imaging artifacts that may result from support contact, as detailed in U.S. Pat. No. 7,946,700, which is incorporated herein by reference to the extent in which this document is not inconsistent with the present disclosure and in particular those parts thereof describing examples of substrate supports for printing systems.

To further reduce substrate-rib contact, ribs 120 may be formed discontinuously. More specifically, each of ribs 120 may include a running straight base structure 120a and a series of rib top portions 120b for contacting substrate 104. These rib top portions 120b define the highest part of substrate support 106, and act as a discontinuous support surface for substrate 104. Rib top portions 120b are an example of projections arranged to support a substrate.

As will be understood, there are a variety of designs for substrate supports provided with openings for addressing substrate buckling. FIG. 2 schematically depicts a partial top view of a substrate support 200 according to examples. Support 200 includes a vacuum manifold 201, which may be fabricated of a thermally non-conductive material. In the example of FIG. 2, openings 221 are constituted as a plurality of vacuum passageways, or ports, distributed across a projected surface 204 such that a vacuum can be draw down through the ports-(the vacuum being represented by arrows labeled "Fv"). Further, openings 221 are dimensioned for allowing deformation of the substrate towards the support base.

Interspersed with the pattern of vacuum ports 203 is a set of platen surface channels 205. Inlaid within each of the channels is a strip heater 207 (other patterns and shapes may be employed). Heaters 207 are connected to a power source (not shown) in any convenient manner. Strip heaters 207 may implement the functionality of heat source 118.

Figure 2:
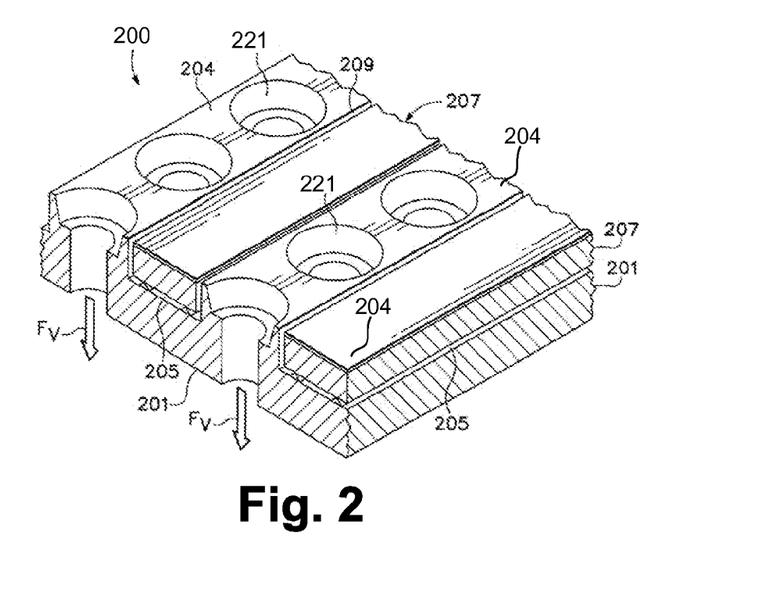
FIG. 2 schematically depicts a partial top view of a substrate support of a printing system according to examples.

In the example of FIG. 2, projected surfaces 204 as well as strip heater 207 are examples of projections arranged to support a substrate. Further examples of substrate supports constituted similarly as support 200 are illustrated in U.S. Pat. No. 6,454,478, which is incorporated herein by reference to the extent in which this document is not inconsistent with the present disclosure and in particular those parts thereof describing substrate supports for printing systems.

Openings, such as openings 121-221 described above, prevent substrate buckling towards a printing arrangement placed over it by allowing deformation of the substrate towards the base of the substrate support. Moreover, such openings facilitate ink drying, which may be particularly important for wet ink printing, and reduce friction between substrate and support. However, a substrate support including such spacings may induce substrate-height variations.

Figure 8:
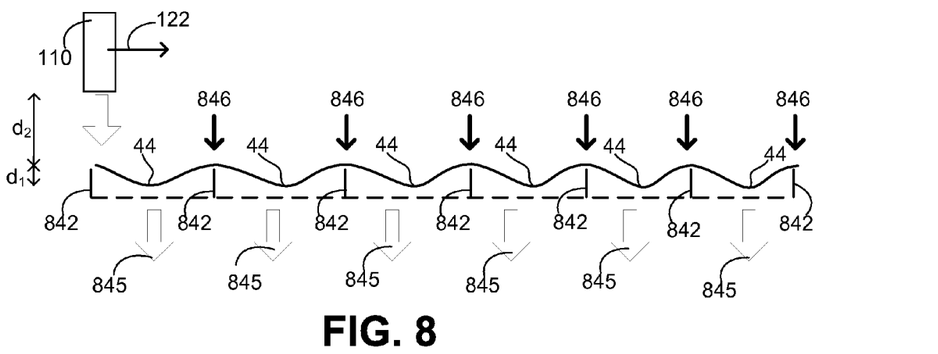
FIG. 8 schematically depicts an arrangement for determining color on a substrate.

More specifically, as can be appreciated from FIGS. 3 and 8, substrate buckles 44 may be formed towards the support base at the spacings. In these examples, due to the platen ribs, substrate deformation is directed towards spacings formed between the ribs. Further, in some printing systems, the substrate is displaced along the ribs during placement of the substrate on the substrate support; such a displacement may induce a wave-formed deformation along the substrate that further promotes buckling forming. In general buckling formation is difficult to pre-determine.

A further source for buckle formation may be vacuum generated by a vacuum system (e.g., vacuum arrangement 130 in FIG. 1A) for improving substrate adherence to the support. The effect of vacuum on substrate height can be appreciated from FIG. 8: vacuum 45 generated by a vacuum system for improving substrate adherence to the support may still further promote formation of buckles 44. By way of example, buckle size (depicted in FIG. 8 by arrow $d_1$) may be between 0.5 and 1 mm such as 0.7 mm. Such a buckle size may be relatively significant when compared to the sensor-to-substrate distance (depicted in FIG. 8 by arrow $d_2$), which may be between 1.2 and 3.7 mm such as 2.7 mm.

FIG. 3 further illustrates details of a print system according to examples. FIG. 3 is a block diagram of a printing system 300 according to examples. Printing system 300 includes a printing arrangement 102 for printing a pattern (not shown in FIG. 3; some examples are depicted in FIGS. 6A-6B) on substrate 104. In examples, printing arrangement 102 is configured for inkjet printing. Printing arrangement 102 may be configured to implement other printing methods such as laser printing. In the illustrated example, printing arrangement 102 includes ink printheads 312a-312d for printing substrate 104 in a printing zone 103. Further, printing arrangement 102 is provided mounted onto a carriage 316, which is operatively coupled to a carriage drive 318 for traversing along transition direction 122. Carriage drive 318 may be operatively coupled to a position registering system (e.g., a combination of a servo and an encoder) to facilitate positioning of the elements mounted on the carriage (e.g., the color sensor). Printing zone 103 is a region over which printing arrangement 102 can be scanned.

In the illustrated example, carriage 316 further supports a color sensor 324. Color sensor 324 is configured to provide a color output signal associated with color of the printed pattern. The output signal of color sensor 324 is, generally, sensitive to sensor-to-substrate distance so that substrate-height variability may affect the result of a color measurement across substrate 104. As illustrated, color measurement is performed in a color measurement zone 112, which is a region over which color sensor 342 can be scanned. Since both color sensor 324 and printing arrangement 102 are mounted on carriage 316, color measurement zone 112 and printing zone are coincident in the illustrated example.

According to some examples, a further sensor 322 (hereinafter referred to as vertical sensor 322) may be included for providing an output signal associated with vertical position of substrate locations. Vertical sensor 322 may be a height sensor that enables determining sensor-to-substrate distance or a more general sensor that provides an output signal sensitive to sensor-to-substrate distance. Using a vertical sensor facilitates compensating substrate-height variability by dynamically selecting color measurement location taking into account substrate vertical position so as to reduce color measurement variability across the sensor scan axis caused by variations in the sensor-to-substrate distance. Alternatively or in addition thereto, a vertical sensor may be used for adjusting the output from color sensor 324 for so as to reduce color measurement variability across the sensor scan axis caused by variations in the sensor-to-substrate distance. Such an operation of a vertical sensor is illustrated with respect to FIG. 7.

As shown in the Figure, printing system 300 may further include a substrate support 106 on which substrate 104, or a portion thereof, lies while color sensor 324 is being operated. Substrate 104 can be advanced over support 106 in media advance direction 124, which is perpendicular to the plane of the Figure. A controller 330 is configured for being operatively connected to the above elements of Printing system 300 as well as an ink reservoir 332, a memory device 334, and a printjob source 336.

In the illustrated example, substrate support 106 is constituted by a platen that includes a base 126 and upstanding and spaced ribs 342. The ribs illustrated in FIGS. 2 and 6A have a straight shape along media advance direction 124. As set forth above, ribs are provided for facilitating substrate displacement as well as preventing upward buckling of a substrate towards a print arrangement.

As used herein, a printhead is a device including nozzle or nozzles through which drops of a fluid can be ejected towards a substrate for performing printing. The particular fluid ejection mechanism within the printhead may take on a variety of different forms such as, but not limited to, those using piezoelectric or thermal printhead technology. In the illustrated example, each of ink printheads 312a-312d is configured to eject ink 338 of a different color (referred to as base colors). It will be appreciated that printing system 300 may include any number and configuration of printheads suitable for a particular application.

Ink printheads 312a-312d are fluidly connected to ink reservoir 332. Ink reservoir 332 includes separated reservoirs 332a-332d for providing ink to the respective ink printhead. In the illustrated example, reservoirs 332a-332d respectively store cyan ink, magenta ink, yellow ink, and black ink. Printing systems commonly employ a plurality of ink printheads to produce secondary colors by combining ink from different ink printheads. Base colors are reproduced on substrate 104 by depositing a drop of the required color onto a dot location. Secondary or shaded colors are reproduced by depositing drops of different base colors on adjacent dot locations; the human eye interprets the color mixing as the secondary color or shading.

Controller 330 is configured to execute methods described herein. Controller 330 may be implemented, for example, by one or more discrete engines and/or modules (e.g., data processing components) that are not limited to any particular hardware, firmware, or software (i.e., machine readable instructions) configuration. More specifically, controller 330 may be configured to implement any of a test print engine 402, a positioning engine 404, a color determination engine 406, or a color calibration engine 408, which are illustrated below with respect to FIG. 4. Controller 330 may be implemented in any computing or data processing environment including digital electronic circuitry, e.g., an application-specific integrated circuit, such as a digital signal processor (DSP) or in computer hardware, firmware, device driver, or software (i.e., machine readable instructions). In some implementations, the functionalities of the engines and/or modules are combined into a single data processing component. In other versions, the respective functionalities of each of one or more of the engines and/or modules are performed by a respective set of multiple data processing components.

Memory device 334 is accessible by controller 330. Memory device 334 stores process instructions (e.g., machine-readable code, such as computer software) for implementing methods executed by controller 330, as well as data that controller 330 generates or processes to implement techniques described herein. Memory device 334 may include one or more tangible machine-readable storage media. Memory devices suitable for embodying these instructions and data include all forms of computer-readable memory, including, for example, semiconductor memory devices, such as EPROM, EEPROM, and flash memory devices, magnetic disks such as internal hard disks and removable hard disks, magneto-optical disks, and ROM/RAM devices.

For printing a pattern on substrate 104, controller 330 may receive printjob commands and data from printjob source 336, which may be a computer source or other source of printjobs. Controller 330 typically determines a print mask from the received data. The print mask may be stored in memory device 334. Controller 330 is operatively connected to printing arrangement 102 and ink reservoir 332 to control ejection of ink 338 according to the print mask. Further, controller 330 acts according to the print mask to provide motion control signals to carriage drive 318 to traverse carriage 316 across substrate 104 (i.e., in transition direction 20).

Vertical sensor 322 encompasses any type of sensor suitable to provide an output signal associated with vertical position of substrate locations. A vertical position refers to a position on the substrate along an axis perpendicular to the substrate plane (i.e., a plane corresponding to a non-deformed plane). It will be understood that substrate vertical position as used herein is with respect to a substrate portion facing printing arrangement 102. Further, a substrate location as used herein refers to a substrate portion facing printing arrangement 102. As used herein, substrate vertical position is directly correlated to substrate-height. Substrate vertical position may vary across a substrate due to, for example, a varying profile of the substrate supports, as illustrated with respect to FIGS. 1 and 12, or a varying substrate thickness.

Each of vertical sensor 322 and color sensor 324 may be constituted by a plurality of sensors cooperating for performing the functions described above. Generally, vertical sensor 322 and color sensor 324 are mounted such that the output of vertical sensor 322 corresponds to or is indicative of sensor-to-substrate distance with respect to color sensor 324. More specifically, the relative spatial configuration between vertical sensor 322 and color sensor 324 may be such that information associated with the sensor-to-substrate distance regarding color sensor 324 can be inferred from the signal output of vertical sensor 322. This information may enable to (a) directly infer an absolute value of the sensor-to-substrate distance (see, e.g., the example with respect to FIG. 2), or (b) infer a parameter correlated to sensor-to-substrate distance (e.g., the vertical signal output illustrated with respect to FIG. 4). Regarding (b), in some examples the relative position between vertical sensor 322 and color sensor 324 is registered so that information related to sensor-to-substrate distance with respect to color sensor 324 can be inferred from the output of vertical sensor 322.

In the example in FIG. 1, vertical sensor 322 and color sensor 324 are illustrated mounted on carriage 316. In other examples, vertical sensor 322 and color sensor 324 may be mounted on another part of a printing system, for example, on an additional carriage capable of performing scanning over substrate 104. Vertical sensor 322 and color sensor 324 may be mounted such that they can move independently from each other (e.g., by providing each sensor in independently movable carriages).

As set forth above, color sensor 324 is to provide a color output signal associated with color of the printed pattern. A color sensor may be constituted, for example, by a spectrophotometer or a colorimeter. As set forth above, vertical sensor 322 is to provide an output signal associated with vertical position of substrate locations. Vertical sensor 322 may be a distance sensor such as an ultrasound sensor or an IR sensor arranged with a pre-determined spatial configuration such that the signal output of the vertical sensor enables to infer sensor-to-substrate distance of color sensor 324. For example, as depicted in FIG. 1, vertical sensor 322 may be arranged in the proximity of, or adjacent to, color sensor 324 and to translate conjointly therewith by mounting both sensors onto carriage 316. In some examples, vertical sensor 322 and color sensor 324 may be integrated within the same sensor system as illustrated in US application with publication number US2010/284009, which is incorporated herein by reference to the extent in which this document is not inconsistent with the present disclosure and in particular those parts thereof describing color measurement.

FIGS. 4-5 depict various examples of physical and logical components for implementing various examples. In discussing FIGS. 4-5, reference is made to FIGS. 6A-6B to provide contextual examples. Implementation, however, is not limited to these examples.

FIG. 4 depicts a system 400 for facilitating color analysis. System 400 may be integrated in a printing system. For example, system 400 may be implemented using controller 330 and memory device 334 depicted in FIG. 3. In other examples, system 400 may be implemented in a computing system communicatively connected to a printing system for partially or completely performing the functionality described herein.

System 400 includes a test print engine 402 and, optionally, any of a positioning engine 404, a color determination engine 406, or a color calibration engine 408. Test print engine 402 is configured to cause printing of color patches on a substrate. Some examples of color patches printed on a substrate 104 by operation of test print engine 402 are illustrated with respect to FIGS. 6A-6B.

FIG. 6A schematically depicts substrate 104 printed with color patches 602a-602d, according to an example. Substrate 104 is supported by substrate support 606 including ribs 604. Ribs 604 constitute support projections arranged to support substrate 104. More specifically, ribs 604 are straight and substantially flat such that the ribs support substrate 104 continuously along the whole depicted rib length. In the depicted configuration, the whole length of ribs 604 under substrate 104 functions as projections arranged to support the substrate.

FIG. 6B schematically depicts a substrate 104' printed with color patches 602a'-602c', according to an example. (Substrate 104 and color patches 602a'-602c' are represented transparent in FIG. 6B for the sake of illustration.) Substrate 104' is supported by substrate support 106 described above regarding FIGS. 1A-1C. Support 106 includes ribs 120 with a zigzag shape. Further, ribs 120 include rib top portions 120b that, in the depicted configuration, function as support projections arranged to support substrate 104 discontinuously along the length of ribs 120.

Referring back to FIG. 4, test print engine 402 is configured to select dimension and location in the substrate of color patches. Test print engine 402 performs this selection such that, for each of the color patches, at least a patch portion can be positioned on a support projection in the color measurement zone. By way of example, test print engine 402 may perform this selection based on dimension and location of support elements such as the support projections or openings so that dimensions and location of color patches can be conveniently selected. By way of example, selection may include dynamically computing dimension and location in the substrate of color patches based on the spatial configuration of support projections. In another non-limiting example, selection may include choosing from a pre-defined set of patch dimensions and/or locations the most convenient set for a particular type of support projections and/or openings.

Examples of the result of a selection performed by test print engine 402 can be appreciated in the examples depicted in FIGS. 6A-6B. Regarding FIG. 6A, color patches 602a-602d are printed with dimensions and locations on substrate 104 such that, as depicted, the color patches (in this example, the whole area of each color patch) can be positioned on corresponding support projections, which in this example are constituted by ribs 604. Regarding FIG. 6B, color patches 602a'-602c' are printed with dimensions and locations on substrate 104' such that, as depicted, a portion of each of the color patches can be positioned on a corresponding support projection, which in this example are constituted by rib top portions 120b. In some examples, as shown in FIG. 6A, each of color patches 602a-602d can be completely positioned on a corresponding support projection. In other examples, as shown in FIG. 6B, dimension and location of the color patches are selected such that only a portion of one or all color patches can be positioned on a support projection.

Test print engine 402 may be further configured to select color patch dimension such that a distance between central patch portions of adjacent color patches positioned in the color measurement zone for operation of the color sensor corresponds to a distance between central rib portions of adjacent ribs over which central patch portions are positioned for operation of the color sensor. By selecting in this manner central patch portion distances, it is facilitated that color patches can be conveniently positioned with respect to the support projections arranged to support the substrate. The result of such a selection can be appreciated in the examples in FIGS. 6A-6B.

Regarding FIG. 6A, patches 602a-602d are located on the substrate with a distribution corresponding to that of ribs 604. That is, the distance between central portions of color patches 602a-602d is equal to central portions of ribs 604 and corresponds to distance D indicated in the Figure. In this specific example, patches 602a-602d, as well as the support projections (in this example, ribs 604) are equidistantly distributed along transition direction 122.

In other examples, e.g. as in FIG. 6B, distances between adjacent support projections may be not equidistant; in other words, patches may be distributed along transition direction 122 with distances between adjacent patches that may differ from each other. More specifically, in the example of FIG. 6B, since ribs 120 have a zigzag shape and are out of phase with respect to each other along media advance direction 124, distances between adjacent support projections, in this case rib top portions 120b, varies from rib-to-rib. In this specific example, two different distances $D_1$, $D_2$ between rib top portions 120b are shown. Relative locations of color patches 602a'-602c' is selected corresponding to the varying distances $D_1$, $D_2$.

Test print engine 402 may be further configured to select patch location in the substrate such that the center of a first patch can be aligned over a first support projection available under the paper, when the printed substrate is on the substrate support for color analysis. This can be appreciated from the examples in FIGS. 6A-6B: in the example of FIG. 6A, the rightmost patch (i.e., patch 602d) can be aligned over the rightmost rib 604. In the example of FIG. 6B, the rightmost patch (i.e., patch 602e) can be aligned over the rightmost rib top portion 120b.

In order to save costs associated with ink usage, it may be convenient to print a color patch with reduced dimensions. Some methods for color analysis require a certain patch size for averaging color measurements over the path surface in order to compensate for substrate-height variability effects on color analysis. In contrast thereto, at least some of the examples herein do not necessarily require performing such an averaging since substrate-height variability effects may be prevented using a single measurement in one color patch. More specifically, at least some of the examples herein facilitate performing color analysis using a single measurement at a sample portion on the patch at a conveniently selected substrate height. Therefore, as the present inventors have understood, reducing patch size in some of the examples illustrated herein is not necessarily limited by the requirement of performing multiple color measurements in order to provide sufficient data for performing an average.

Therefore, in view of the fact that a single color measurement performed on conveniently located patches may already yield a good basis for color analysis, test print engine 402 may be further configured to select at least one dimension of a color patch (e.g., width or length) based on a positioning tolerance of a substrate positioning system (e.g., feeding mechanism 116 in FIG. 1A) configured to position the substrate over the substrate support. Note that in the other techniques referred to above, this positioning tolerance may not be the patch size constraint in view of a minimum patch size necessary for enabling averaging color values for a single patch. Taking into account substrate positioning tolerance facilitates avoiding a misplacement of color patches relative to corresponding projections while keeping printed patch size small.

Depending on the particularly used printing system, field of view of a color sensor that performs color analysis of the color patch (e.g., color sensor 324) may be the constraint for selecting reduced patch dimensions. Therefore, according to some examples, test print engine 402 may be further configured to select at least one dimension of a color patch (e.g., width or length) based on field of view of a color sensor configured to perform color analysis of the color patch.

For performing the functions described above, test print engine 402 may access data related to the spatial configuration of the support projections as well as position of the color measurement zone. This data may be stored as part of position data 410 in data store 412.

Positioning engine 404 is configured to position a substrate printed with color patches such that, for each color patch, at least a portion of the color patch is positioned over a support projection in the color measurement zone. More specifically, positioning may be performed such that a sample portion of a patch is over a portion of a projection in a color measurement zone (e.g., measurement zone 112 shown in FIG. 1). A patch sample portion refers to a portion of a patch onto which color analysis is to be performed.

By way of example, referring to FIG. 1, positioning engine 404 may cause feeding mechanism 116 to laterally align a substrate with support projections. By way of example, positioning engine 404 may operate a feeding mechanism to position the color patches in color measurement zone 112 such that a color acquisition can be performed on patch portions that are on a projection. In the example of FIG. 6A, in view of the straight shape of ribs 604, this can be performed directly by simply advancing substrate 104 along direction 124. In the example of FIG. 6A, in view of the irregular location of rib top portions 120b, this can be performed directly by advancing substrate 104 along direction 124 until a location is reached in which at least a portion of each color patch is on top rib portion 120b.

Positioning engine 404 may be configured to position the substrate based on the spatial configuration of the support projection and the color measurement zone. For example, positioning engine 404 may access data related to the spatial configuration of the printed patches and support projections as well as substrate position and position of the color measurement zone. This data may be stored as part of position data 410 in data store 412. Using this data, positioning engine 404 may cause a substrate positioning system to position the substrate such that at least a portion of a color patch is disposed on a support projection, as depicted in FIGS. 6A-6B.

For performing its function, positioning engine 404 may position the substrate based on data provided by a positioning sensor configured to measure substrate position using the substrate support, or another element of the particularly used printing system, as reference. By way of example, a line sensor, an example thereof is implemented in Designjet printers (e.g., Designjet Z series) of Hewlett-Packard Company (Palo Alto, Calif., US), may be used as such a positioning sensor. By way of example, positioning engine 404 may be configured to position the substrate over the substrate support such that the center of a first patch is aligned over a first support projection available under the paper. In the example of FIG. 6A, the rightmost patch (i.e., patch 602d) is aligned over the rightmost rib 604. In the example of FIG. 6B, the rightmost patch (i.e., patch 602e) is aligned over the rightmost rib top portion 120b.

Referring back to FIG. 4, color determination engine 406 is configured to operate a color sensor (e.g., color sensor 110 depicted in FIG. 1A) for determining color of a color patch. More specifically, color determination engine 406 may cause a color sensor to generate, for each color patch onto which color analysis is to be performed, a sensor output associated with a sample portion within the color patch. The sample portion is over a support projection. FIGS. 6A-6B illustrate such sample portions: regarding FIG. 6A, sample portions 603a-603d are associated, respectively, with color patches 602a-602d; sample portions 603a-603d are located within color measurement zone 112 and above a rib portion acting as support; regarding FIG. 6B, sample portions 603a'-603c' are associated, respectively, with color patches 602a'-602c'; sample portions 603a'-603c' are located within color measurement zone 112 and above respective rib top portions 120b.

From the sensor output, color determination engine 406, or any other suitably configured computing element, may determine color of the sample portion. Thereby, it is facilitated that color analysis is performed using color measurements associated with substrate vertical positions corresponding to support projections. Further, thereby, it is facilitated consistency of color analysis with respect to substrate-height variability. Moreover, as set forth above, support projections may be arranged such that substrate locations thereon are at sensor-to-substrate distance corresponding to a nominal value specified for the color sensor.

In some other examples, color acquisition engine 504 is configured to determine color at sample portions on support projections by (i) causing and/or receiving color measurements registered with the location of substrate location in which the color measurements are performed, and (ii) filtering out color measurements on the basis of location of substrate location such that color measurements that correspond to sample portions on support projections are retained.

Color calibration engine 408 is to perform color calibration of a printing arrangement. The color calibration may be based on colors determined by color determination engine 404. Color calibration using colors acquired at sample portion over a support projection as described herein prevents that substrate-height variability affects the calibration results. Color calibration refers to measuring and/or adjusting color response of a printing system. Adjustment may be performed such that color response corresponds to a known state (e.g., a color standard). Color calibration using a selected substrate location as described herein prevents that substrate-height variability affects the calibration results. It will be understood that a variety of color calibration methods may be used depending on the particular application of the color analysis. For example, color calibration may include establishing a known relationship to a standard color space.

The components described above with respect to FIG. 4 are implemented as combinations of hardware and programming. Such components may be implemented in a number of fashions. As depicted in FIG. 5, the programming may be processor executable instructions stored on a tangible memory media 500 and the hardware may include a processor 502 for executing those instructions. Memory 500 can be said to store program instructions that, when executed by processor 502, implement system 400 of FIG. 4. Memory 500 may be integrated in the same device as processor 502 or it may be separate but accessible to that device and processor 502. In an example, memory 500 and processor 502 are implemented in a printing system, such as printing system 300, namely, as part of memory device 334 and controller 330. In other examples, memory 500 and processor 502 are implemented in a computing system communicatively coupled to a printing system for implementing the functionality described herein.

Examples of system 400 can be realized in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

In one example, program instructions can be part of an installation package that can be executed by processor 502 to implement system 400. In this case, memory 500 may be a portable medium such as a CD, DVD, or flash drive or a memory maintained by a server from which the installation package can be downloaded and installed. In another example, the program instructions may be part of an application or applications already installed. Here, memory 600 can include integrated memory such as a hard drive.

In FIG. 5, the executable program instructions stored in memory 500 are depicted as a test print module 504, a positioning module 506, a color determination module 508, or a color calibration module 510. Test print module 504, positioning module 506, color determination module 508, and color calibration module 510 represent program instructions that when executed cause the implementation of, respectively, test print engine 402, positioning engine 404, color determination engine 406, and color calibration engine 408 of FIG. 4.

Figure 7:
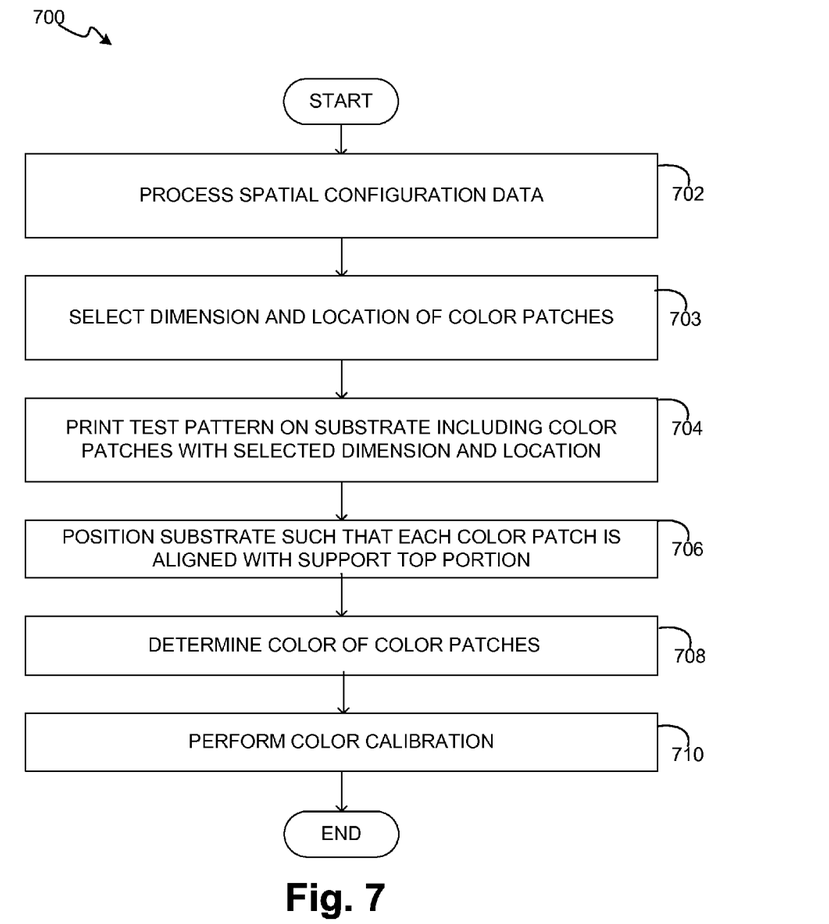
FIG. 7 is a flow diagram illustrating examples of color analysis.
Figure 9:
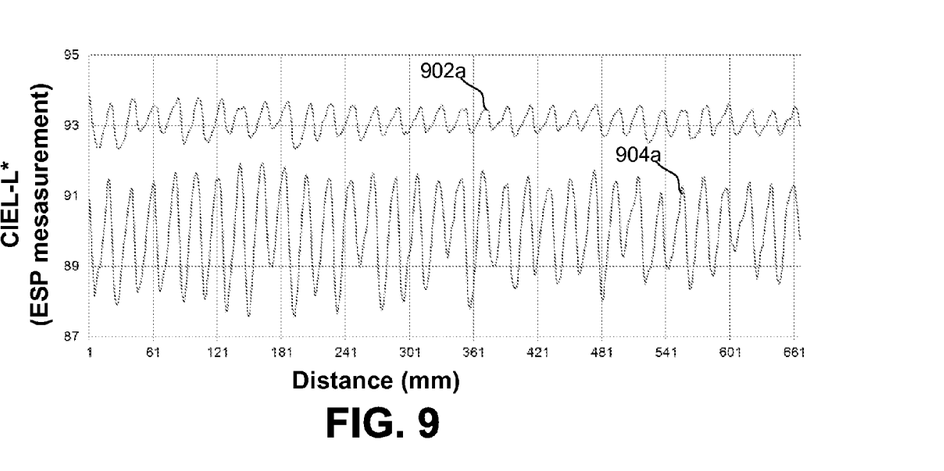
FIG. 9 shows a graph illustrating color measurements.
Figure 10:
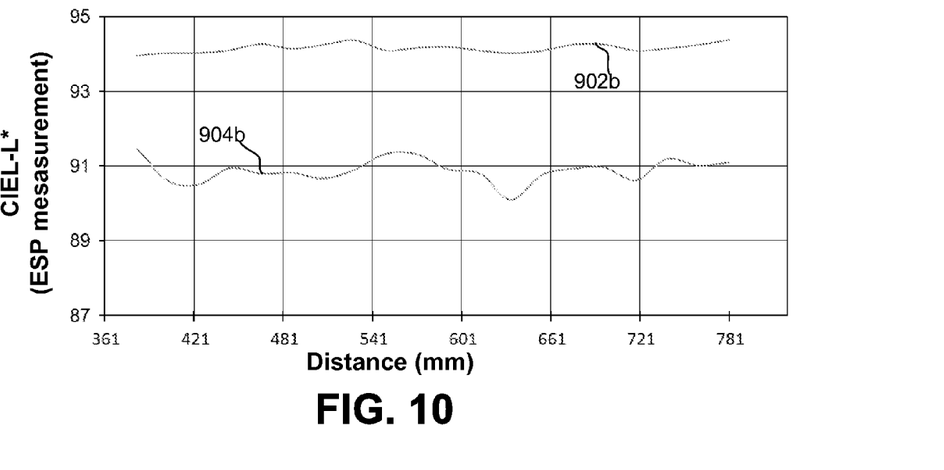
FIG. 10 shows a graph illustrating color measurements.

FIG. 7 shows a flow diagram 700 that implement examples of a color analysis method for calibrating a printing system. In discussing FIG. 7, reference is made to the diagrams of FIGS. 1-6B to provide contextual examples. Implementation, however, is not limited to those examples. Reference is also made to FIGS. 8-10. Again, such references are made simply to provide contextual examples.

Referring to FIG. 7, at block 702 data associated with spatial configuration of elements in a printing system may be processed. The spatial configuration data may include spatial configuration of elements of the substrate support such as dimensions (e.g., length, width), position, and/or shape of elements of the support such as support projections. The spatial configuration data may further include spatial configuration of a color sensor configured to acquire color measurements for the color analysis. Referring to FIG. 4, test print engine 402 may be responsible for implementing block 702.

Processing at block 702 may include, by way of example, receiving the data from an external system, accessing stored data (e.g., spatial configuration data stored as part of position data 410 in data store 412, or receiving a user input. In examples, spatial configuration data may be previously acquired by a printed system using suitably configured sensors (e.g., a distance sensor operated over an unloaded substrate support). Processing at block 702 may also include transforming the spatial configuration data (e.g., changing units, or absolute spatial references) so that the data can be used to determine the pattern to be printed.

At block 703, dimension and location in a substrate of color patches may be selected such that, for each color patch, at least a portion of the color patch can be positioned on a support projection in the color measurement zone when the substrate is positioned on the substrate support for operation of a color sensor. Data processed at block 702 may be used to implement block 703. For example, position and location of support projections may be inferred at block 702; from this information, the dimension and location of color patches can be computed that enable to position the substrate over the substrate support such that, for each color patch, at least a portion of the color patch can be positioned on a support projection in the color measurement zone. This computation may be performed iteratively. For example, position and location of a first patch may be computed using as reference a first support projection (e.g., a support rib); then position and location of a second patch may be computed using as reference a further support projection adjacent to the first support projection; these steps may be repeated until position and location of all patches to be printed are computed. Referring to FIG. 4, test print engine 402 may be responsible for implementing block 703.

At block 704, a test pattern may be printed on a substrate including color patches with dimension and location selected at block 703. Some examples of test patterns that may result from block 704 are illustrated with respect to FIGS. 6A-6B. Referring to FIG. 4, test print engine 402 may be responsible for implementing block 704.

At block 706, a substrate with a test pattern printed at block 704 may be positioned on a substrate support. The substrate support includes i) projections extending from a base of the support, the projections arranged to support the substrate, and ii) openings to allow deformation of the substrate towards the support base. Some examples of such substrate support are illustrated above with respect to FIGS. 1A-2. In a more specific example, block 706 may include positioning at least a portion of a color patch over a support projection taking into account, at least, dimension and location of the color patch. As set forth above, the test pattern may be printed by taking into account the spatial configuration of the substrate support such that patch portions can be positioned on support projections. The positioning is performed such that, for each color patch, a sample portion of the color patch is over a portion of a projection in a color measurement zone. Some examples of test patterns positioned over a substrate support according to block 706 are illustrated with respect to FIGS. 6A-6B. Referring to FIG. 4, positioning engine 404 may be responsible for implementing block 706.

At block 708, color of color patches may be determined. For example, color may be determined at sample portions in a color measurement zone of the printing system, the sample portion being over the support projection. Some examples of sample portions are illustrated with respect to FIGS. 6A, 6B (see sample portions 603a-603d or 603a'-603c'). Further examples of sample portions at which color measurements may be performed are illustrated in FIG. 8 by arrows 846.

Block 708 may include causing a color sensor to acquire color of a color patch at a sample portion that is located over a support projection. Referring to FIG. 4, color determination engine 406 may be responsible for implementing block 708.

According to some examples, the color sensor may be translated over the substrate while acquiring color only at the sample portions. For example, as illustrated by FIG. 8, color sensor 24 may be operated to acquire color only at selected locations 846 while being scanned along a transition direction 122. In other examples, the color sensor may be translated over the substrate while acquiring color only at the locations that do not necessarily overlay with support projections; a color determination may then include filtering a set of color measurement for processing color measurements associated with the sample portions that are over support projections.

There are a variety of methods for determining the specific spatial location of sample portions, i.e. the absolute positions at which color measurements are to be acquired. By way of example, this specific spatial location may be determined by taking into account the spatial configuration of the substrate support, location of the color measurement zone, and location of the color patches. For example, a printing system may register substrate location and, from that information, infer positions of patch portion; using absolute references, patch portions overlapping support projection and color measurement zone may then inferred after the substrate is positioned. An encoding system coupled to color sensor may be then used to position the color sensor for color acquisition at the sample portions.

In other examples, the specific spatial location of sample portions may be determined dynamically. For example, block 708 may include selecting a color measurement location (i.e., a sample portion as used herein) based on a distance measurement indicative of sensor-to-substrate distance of the color sensor. The selection is performed such that a color measurement location coincides with a support projection.

Such a distance measurement may be performed by a further sensor (e.g., vertical sensor 322) configured for providing an output signal associated with vertical position of substrate locations. Such a further sensor may be, for example, a distance sensor (i.e., a sensor with which a specific substrate vertical position can be determined) or a sensor that is sensitive to sensor-to-substrate distance such as a densitometer. The sample locations may be determined by analyzing, for example, a substrate-height profile, or a profile of a signal output correlated to substrate-height to infer the spatial location of support projections.

Determining color of a printed pattern at a sample portion over the support projections facilitates improving color measurement quality (in particular measurement reliability) as compared to conventional methods, as illustrated by FIGS. 9-10. Both Figures are graphs showing ESP CIE-L* measurements across different substrates lying on a substrate support constituted by a ribbed platen: curves 902a-902b correspond to an Offset substrate; curves 904a-904b correspond to a Vynil substrate (Avery MPI 3000). FIG. 9 shows color curves 902a-904a acquired without considering whether sample portions are over support projections. In contrast thereto, FIG. 10 show color curves 902b-904b acquired using sample portion over support projections. As can be appreciated, color curves shown in FIG. 10 are characterized by a lower variability as compared with the color curves in FIG. 9. By way of example, using sample portion over support projections may facilitate an accurate color measurement with variability below 2 CIEDelta E1976 (or Euclidean distance in CIELab-space). This may translate into a 4× reduction of measurement variability across printer platen as compared to other methods.

According to some examples, block 708 may include adjusting color measurements using measurements associated with substrate vertical position of the selected sample locations for compensating substrate-height variability. Color measurement adjustment facilitates a further compensation of substrate-height variability, which may still influence color analysis even when color measurements are performed at sample portions located over support projections.

Generally, color adjustment is performed using a previous characterization of how color measurements depend on substrate-height. A variety of methods may be used for adjustment of the color measurement. For example, an adjustment matrix may be stored that correlates the following parameters: (a) adjustment factors; and (b) sensor-to-substrate distances; a determined substrate-height may be associated with a corresponding sensor-to-substrate distance; the sensor-to-substrate distance may be used to identify an adjustment factor using the adjustment matrix; finally, a color measurement corresponding to the sensor-to-substrate distance may be adjusted by applying the adjustment factor.

Some examples of methods for adjusting color measurements based on sensor-to-substrate distances are illustrated in US application with publication number US 2011/0032526, which is incorporated herein by reference to the extent in which this document is not inconsistent with the present disclosure and in particular those parts thereof describing color measurement adjustment.

At block 710, color calibration of the printing system used for printing the test pattern at block 704 may be performed based on color determined at block. Referring to FIG. 4, color determination engine 406 may be responsible for implementing block 708. For performing color calibration, color measurements at sample portions corresponding to different color patches may be used. For example, one color measurement per color patch may be used. Using the color determination, the printer system used to print the pattern may be color calibrated as illustrated above with respect to FIG. 4.

Color calibration as described facilitates reducing color patch size as compared with some other methods in which substrate-height variability of color measurements is compensated by (i) measuring color at multiple locations within one color patch (e.g., 4 samples per patch), and (ii) averaging the multiple color measurements for the color patch. Acquisition at multiple locations generally implies a higher patch area. In contrast thereto, examples herein facilitate reducing substrate-height variability of color measurements using a single measurement per patch. Further, these other methods may require N patches for a specific substrate width W so that multiple measurements per patch and a useful average can be obtained; in contrast thereto, at least some examples herein may be performed such that 2N patches fit the same specific width W. Hence, substrate area (and length) required by at least some examples herein may require 35% of the substrate area required by at least some other methods.

As a further advantage, in at least some examples herein, the amount of ink and paper spent in printing a test color pattern can be reduced since patch size can be kept relatively small. Moreover, thereby the amount of time can be reduced since the time used to print and measure a test color pattern for color calibration can be kept relatively low. By way of example, a calibration target of 64 color patches may take 40 seconds using substrate selection compared to 2 min 25 sec of some other methods. As a further remark, at least some examples herein facilitates performing color calibration using color measurements at the nominal sensor-to-substrate distance specified for the color sensor. In contrast thereto, some other methods do not ensure that color calibration is performed at the nominal sensor-to-substrate distance specified for the color sensor, thereby, compromising calibration reliability.

In the foregoing description, numerous details are set forth to provide an understanding of the examples disclosed herein. However, it will be understood that the examples may be practiced without these details. For example, it will be understood that a substrate support as used herein is not limited to a ribbed platen. Further, it will be understood that examples herein are not limited to wet ink printers. While a limited number of examples have been disclosed, numerous modifications and variations therefrom are contemplated. It is intended that the appended claims cover such modifications and variations. Claims reciting "a" or "an" with respect to a particular element contemplate incorporation of one or more such elements, neither requiring nor excluding two or more such elements. Further, the terms "include" and "comprise" are used as open-ended transitions.

What is claimed is:

1. A system comprising:
   a color sensor to determine color of color patches printed on a substrate;
   a substrate support for supporting the substrate during operation of the color sensor, the substrate support including:
     projections extending from a base of the substrate support and arranged to support the substrate, and
     openings to allow deformation of the substrate towards the base;
   a distance sensor to measure a distance indicative of a distance between the color sensor and the substrate; and
   a controller to:
     determine, using the distance measured by the distance sensor, a location of a given projection of the projections, and
     determine a color of a color patch on the substrate at the determined location of the given projection.

2. The system of claim 1, wherein the distance measured by the distance sensor is one of an absolute value of the distance between the color sensor and the substrate or a value from which the distance between the color sensor and the substrate is inferred.

3. The system of claim 1, wherein the controller is to cause printing of color patches on the substrate at selected locations based on measurements of distances by the distance sensor.

4. The system of claim 1, wherein the controller is to adjust a color measurement of the color of the color patch at the determined location, the adjusting based on the distance measured by the distance measure.

5. The system of claim 1, wherein the projections are part of ribs extending from the base, and the openings correspond to spacings provided between adjacent ribs.

6. The system of claim 1, further comprising a test print engine to print the color patches on the substrate, wherein the test print engine is to select at least one dimension of a given color patch of the color patches based on a positioning tolerance of a substrate positioning system configured to position the substrate over the substrate support.

7. The system of claim 1, further comprising a substrate positioning system to position the substrate such that, for each respective color patch of the color patches, at least a portion of the respective color patch is positioned over a respective projection of the projections.

8. The system of claim 7, wherein the substrate positioning system is to position the substrate based on a spatial configuration of the respective projection.

9. The system of claim 1, wherein the determining of the color of the color patch on the substrate at the determined location is based on an output of the color sensor.

10. A non-transitory computer readable storage medium storing instructions that upon execution cause a printing system to:
    position a substrate on a substrate support including:
      projections extending from a base of the substrate support and arranged to support the substrate, and
      openings to allow deformation of the substrate towards the base;
    receive, from a distance sensor, a measured distance indicative of a distance between a color sensor and the substrate;
    determine, using the measured distance, a location of a given projection of the projections; and
    determine a color of a color patch on the substrate at the determined location of the given projection.

11. The non-transitory computer readable storage medium of claim 10, wherein determining the color is based on a color measurement by the color sensor.

12. The non-transitory computer readable storage medium of claim 10, wherein the instructions upon execution cause the printing system to print color patches on the substrate at selected locations based on measurements of distances by the distance sensor.

13. The non-transitory computer readable storage medium of claim 10, wherein the instructions upon execution cause the printing system to print the color patch on the substrate with a patch dimension based on dimensions and locations of the projections.

14. The non-transitory computer readable storage medium of claim 10, wherein the instructions upon execution cause the printing system to perform color calibration of the printing system based on determined colors of sample portions being over the projections.

15. The non-transitory computer readable storage medium of claim 10, wherein the instructions upon execution cause the printing system to adjust a color measurement of the color of the color patch at the determined location, the adjusting based on the measured distance.

16. A method comprising:
  printing a test pattern on a substrate, the test pattern including a plurality of color patches;
  positioning the substrate printed with the test pattern on a substrate support including
    projections extending from a base of the substrate support, the projections arranged to support the substrate, and
    openings between the projections to allow deformation of the substrate towards the support base,
  receiving, from a distance sensor, a measured distance indicative of a distance between a color sensor and the substrate;
  determining, by a controller using the measured distance, a location of a given projection of the projections; and
  determining, by the controller, a color of a color patch on the substrate at the determined location of the given projection.

17. The method of claim 16, wherein determining the color is based on a color measurement by the color sensor.

18. The method of claim 16, wherein the projections are part of ribs extending from the base, the openings correspond to spacings between adjacent ribs.

19. The method of claim 16, wherein printing the test pattern includes printing the color patches with distances between central patch portions of adjacent color patches equal to distances between central portions of adjacent projections.

20. The method of claim 16, wherein the color patches are printed on the substrate at selected locations based on measurements of distances by the distance sensor.

* * * * *